April 14, 1942.   O. KYLIN ET AL   2,279,710
SLIDING GEAR TRANSMISSION
Filed April 4, 1939   8 Sheets-Sheet 3

INVENTOR.
Oskar Kylin and
BY Henrik O. Kylin
Hawgood VanHorn
Their ATTORNEYS

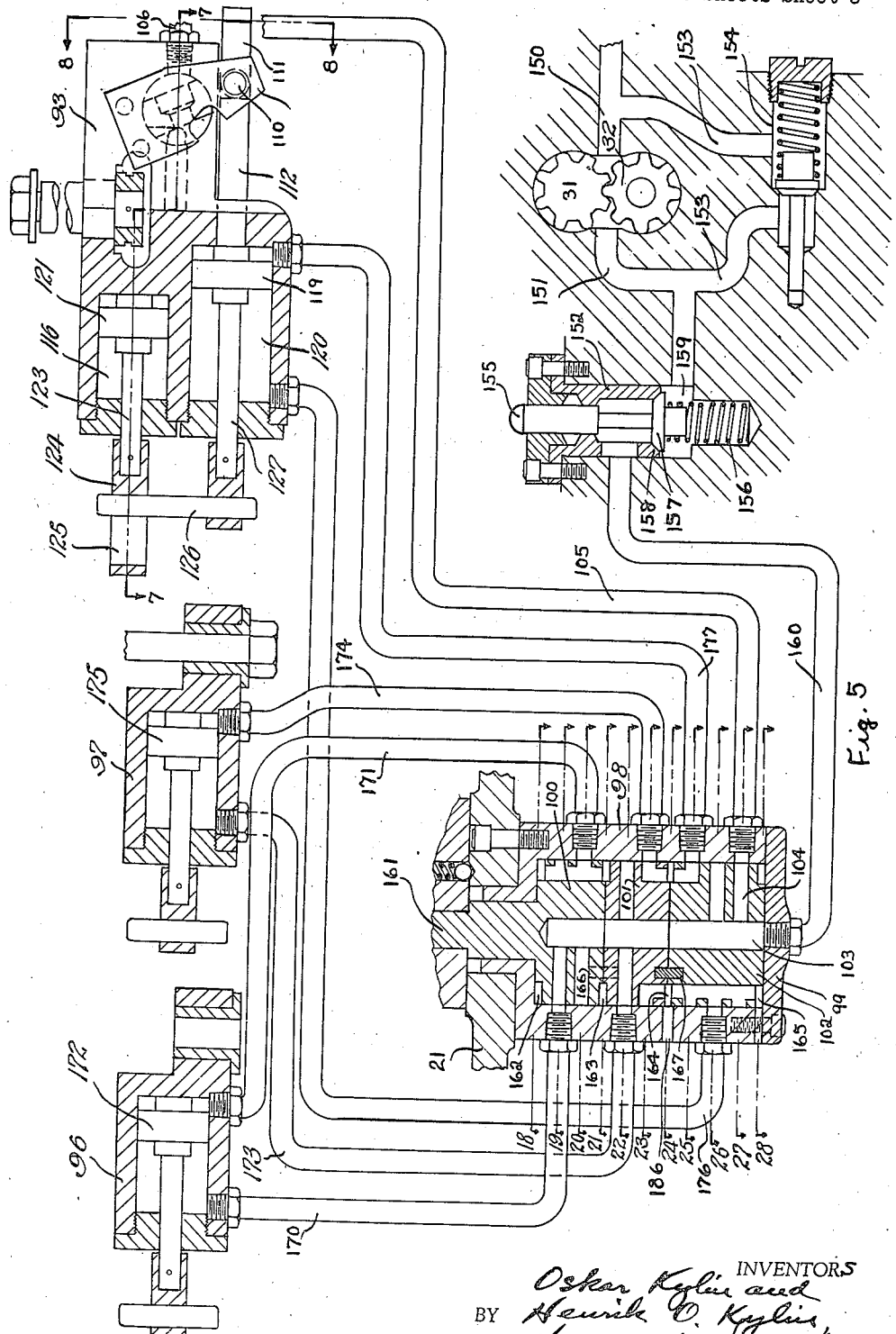

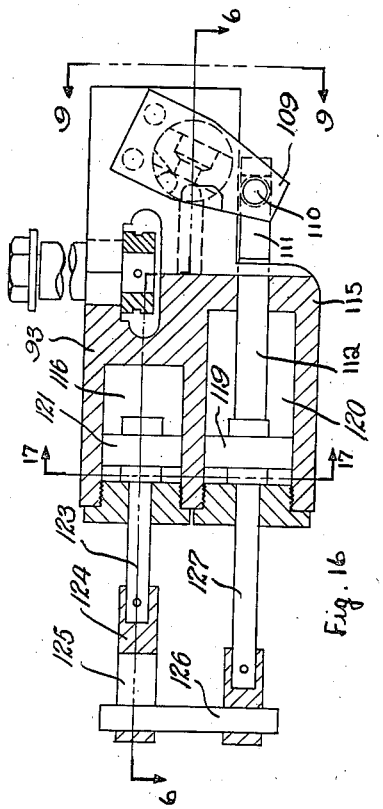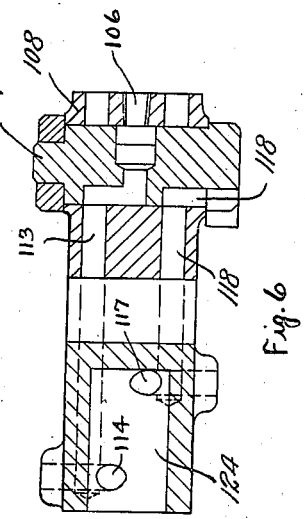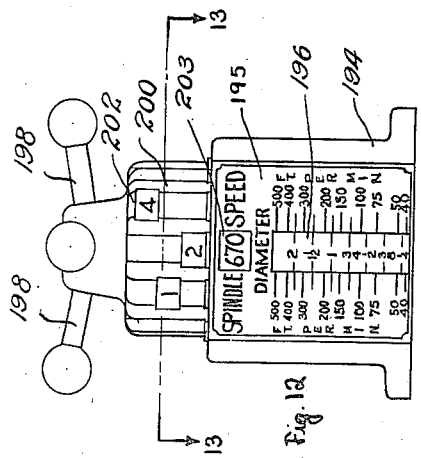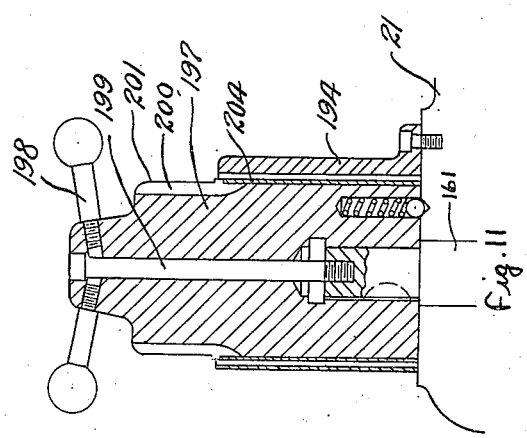

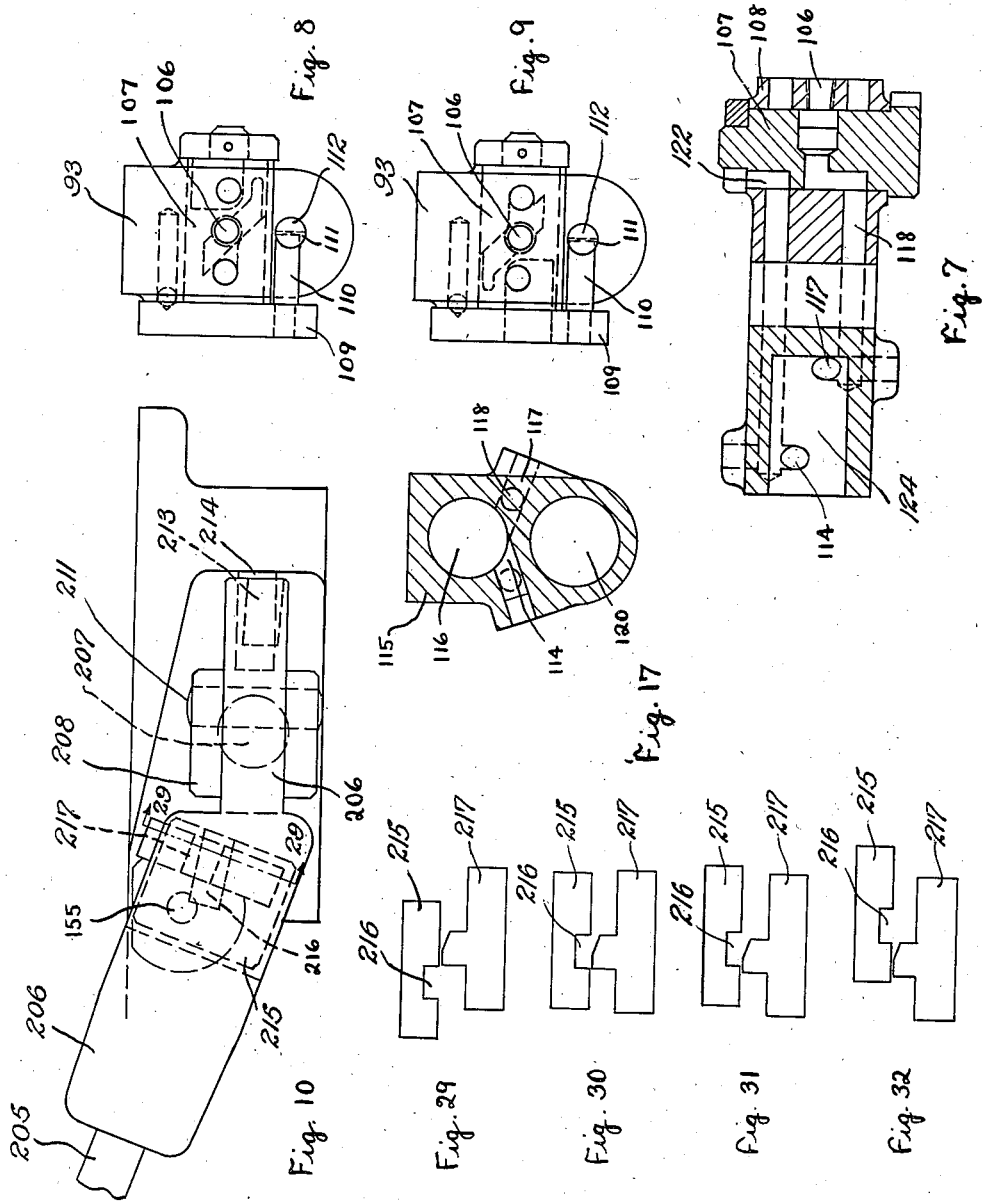

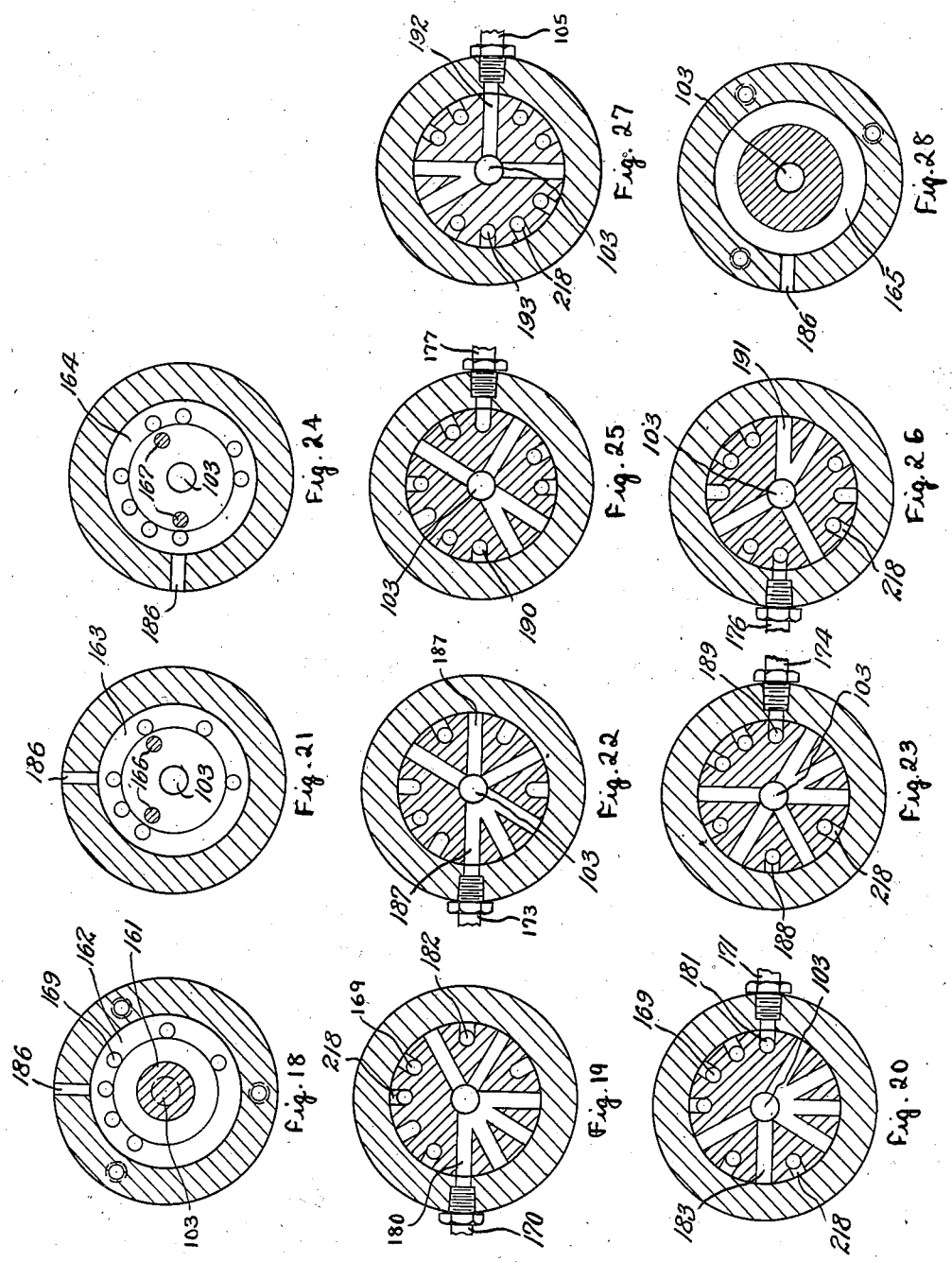

Patented Apr. 14, 1942

2,279,710

UNITED STATES PATENT OFFICE 2,279,710

SLIDING GEAR TRANSMISSION

Oskar Kylin and Henrik O. Kylin, Cleveland, Ohio, assignors to Bardons and Oliver, Inc., Cleveland, Ohio, a corporation of Ohio Application April 4, 1939, Serial No. 265,961

25 Claims. (Cl. 82—29)

This invention relates to a hydraulic preselector speed changing mechanism for sliding gear transmission, and relates more particularly to such means which may be applied to machine tools, such as turret lathes, to preselect the spindle speeds.

It is one of the objects of this invention to preselect the spindle speed of a machine tool, such as turret lathes, engine lathes, drill presses, boring machines, milling machines, and the like, whereby upon subsequent operation of a single control means to disengage the power and engage the gears of the transmission, a spindle speed will be obtained according to the preselected speed indicated by the preselector.

Another object of the invention resides in the provision of a hydraulic preselector including a control or selector valve of simple construction and preferably of the cylinder type whereby a plurality of gear shift cylinders may be conveniently operated by selectively rotating the distributor element of the valve.

Another object of the invention is to provide in a preselector of the above named character a mechanism for timing the brake and clutch actions with the gear shifting means.

Another object of the invention is to provide in a hydraulically operated sliding gear transmission means for preselecting one or more successive spindle speeds and a single control member having a cycle of operation including a forward clutch position, a gear shifting position, a brake position, and a reverse clutch position.

A still further object of the invention is to provide indicator means operatively associated with the preselector valve mechanism whereby the preselected spindle speed position of the valve will be directly readable on said indicator.

Other objects and advantages of our invention will become more apparent from the following description of one embodiment of the same, reference being made to the accompanying drawings, in which like reference characters are employed to designate like parts throughout the same.

In the drawings—

Figure 5 illustrates the hydraulic system employed including the pump, the preselector valve and the several gear sliding cylinders;

Figure 6 is a section taken on line 6—6 of Figure 16 through the auxiliary valve;

Figure 7 is a section taken on line 7—7 of the auxiliary valve shown in Figure 5;

Figure 8 is an enlarged end view of the cylinder unit shown in Figure 5, and is taken in the direction of line 8—8 as indicated;

Figure 9 is a view similar to that of Figure 8 and taken in the direction of line 9—9 of Figure 16, but shows a slightly altered position of the parts;

Figure 10 is an enlarged detail of the manual control taken in the direction of line 10—10 of Figure 2;

Figure 11 is a vertical section through the preselector indicator means;

Figure 12 is a front view of the preselector indicator;

Figure 13 is a transverse section taken on line 13—13 of Figure 12;

Figure 14 is a plan view of one of the indicator clips which may be applied to the preselector indicator;

Figure 15 is a front view of the clip shown in Figure 14;

Figure 16 is a longitudinal section through the auxiliary valve shown in Figure 5 and illustrates the movable parts in their extreme opposite limit of travel as compared to the positions shown in Figure 5;

Figure 17 is a transverse section through the auxiliary valve taken on line 17—17 of Figure 16;

Figure 1:
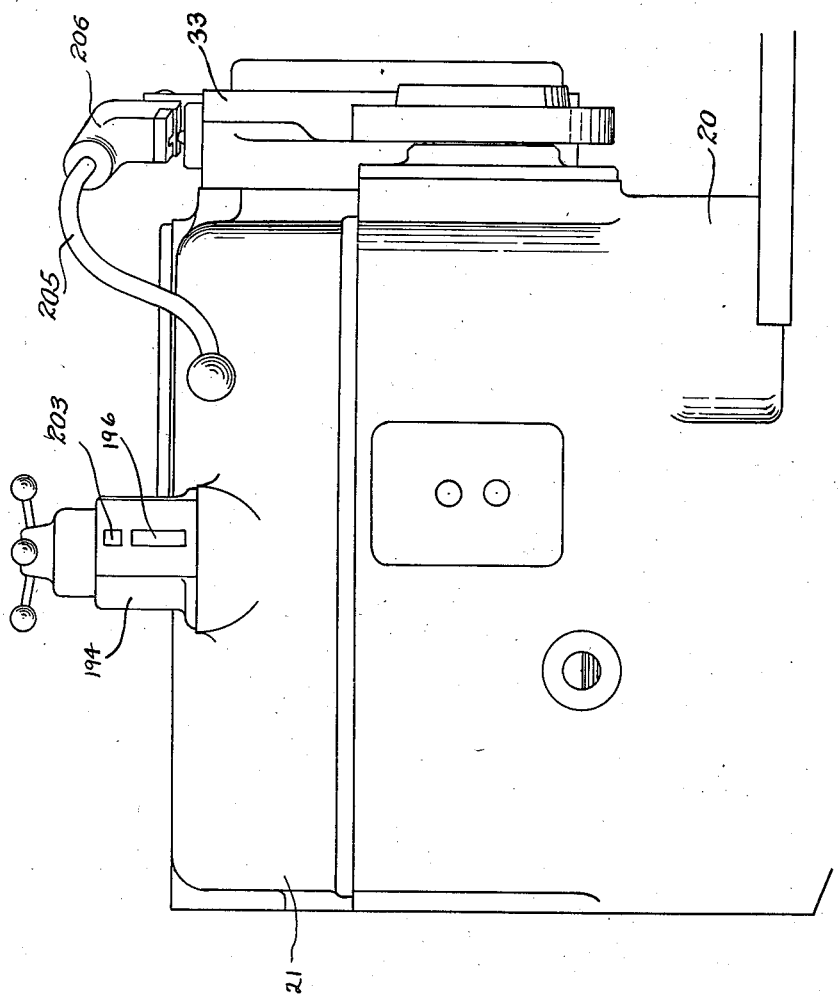
Figure 1 is a front elevation of the head of a turret lathe and shows the means for preselecting the spindle speed and indicating the selected speed, together with the manual control brake and clutch lever.

Figures 18 to 28 inclusive are transverse sections through the preselector valve in Figure 5 and are taken on the respective lines indicated in that figure. These views illustrate the relative positions of the various ducts and parts in the valve when it is set to the preselected position shown in Figure 5;

Figure 29 is a view of the stop blocks taken in the direction of lines 29—29 of Figure 10, and shows their relative positions when the forward clutch is engaged;

Figure 30 is a view similar to that of Figure 29 and shows the relative positions of the blocks when the control lever is in gear shifting position;

Figure 31 illustrates the relative positions of the blocks in brake position; and Figure 32 illustrates the relative positions of the blocks when the control lever is shifted to engage the reverse clutch.

Referring now to the drawings more in detail, we will proceed to describe the structure and operation of the embodiment of our invention illustrated herein.

As shown, the invention is applied to turret lathes, although it will readily be appreciated that the invention is equally well adapted to other machine tools, such as engine lathes, boring lathes, drill presses, milling machines, and the like.

The head stock is indicated generally at 20 and comprises a casting within which is housed a speed change transmission gearing, the selector valve, the control valve, the pump and other parts which will be described in detail.

A cover 21 is removably fixed on the casing by any suitable means.

Figure 4:
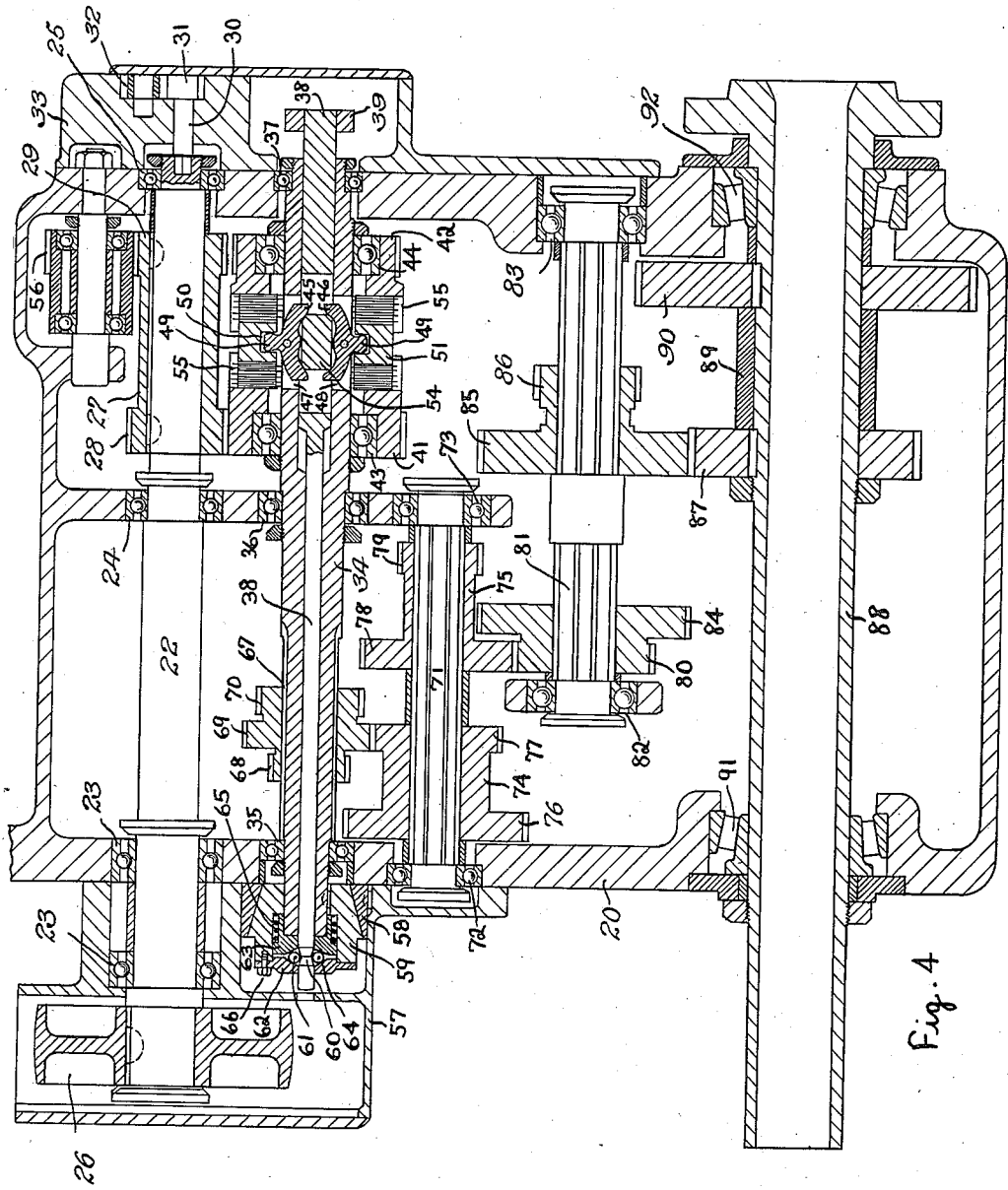
Figure 4 is a section through the head, illustrating the transmission and clutch mechanism more in detail, and is taken along line 4—4 of Figure 2.

Referring now more particularly to Figure 4, we have shown in section that portion of the casing housing the transmission.

The drive shaft 22 is mounted in suitable bearings 23, 24, and 25 lengthwise of the casing, and is equipped at one end with a drive pulley 26 having connection with a suitable source of power through a belt. It is understood that a direct drive may be provided for the shaft 22 by connecting the same directly to an electric motor in any suitable manner.

The forward end of the drive shaft is splined to receive a gear cluster 27 comprising the gears 28 and 29 at opposite ends thereof.

To the end of the shaft is directly connected a stub shaft 30 carrying a pump gear 31 which is in mesh with gear 32 rotatably mounted in the casing 33. The pump gears 31 and 32 comprise an oil pump, the purpose of which will be described more fully hereinafter.

Mounted longitudinally in the main housing 20 is a second shaft 34 which may be termed the clutch shaft, rotatably supported by the bearings 35, 36, and 37.

Figure 2:
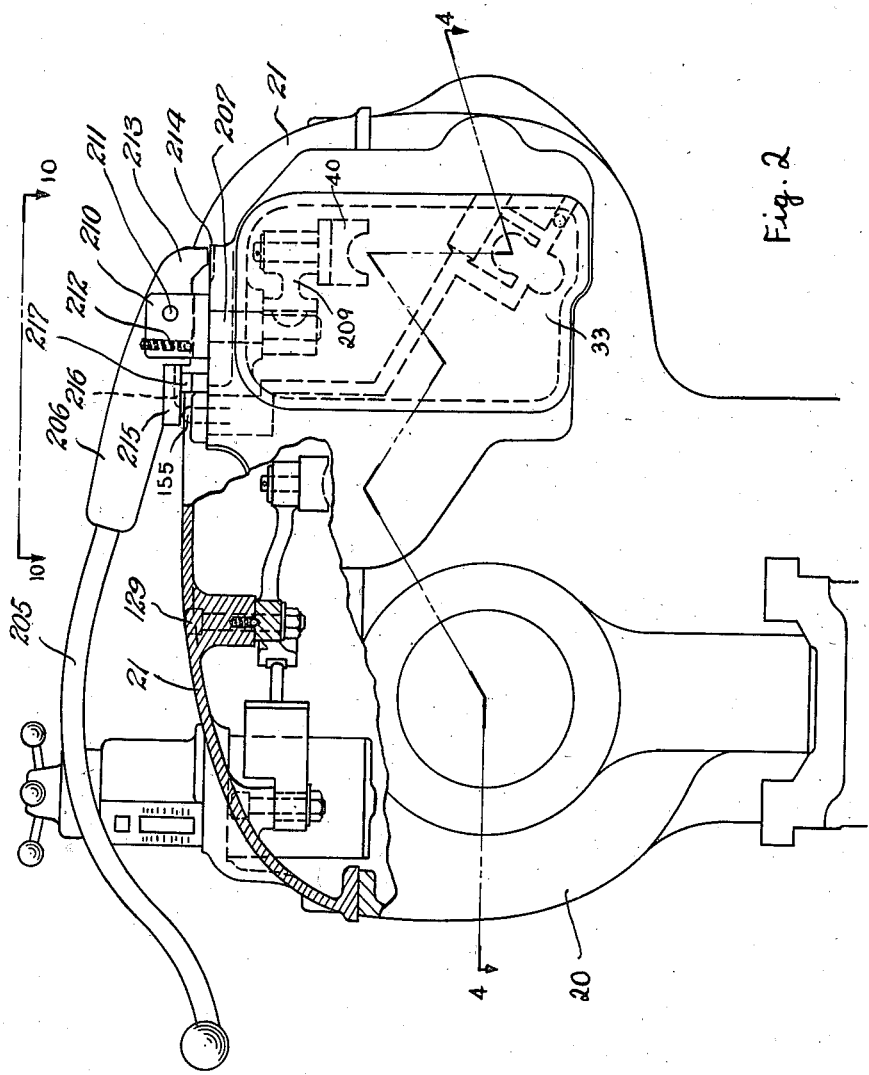
Figure 2 is a front end view of the same with part of the head casing broken away.

The shaft 34 is hollow to telescopically accommodate the plunger 38, which extends axially through the shaft from one end to the other and is provided at its forward end with the spool 39 having connection with a fork 40 which is more generally indicated in Figure 2.

The forward end of the shaft 34 carries the forward and reverse clutch gears, indicated at 41 and 42 respectively, and respectively mounted to rotate on bearings 43 and 44 on the shaft.

Clutch fingers 45 and 46 are rockably mounted in slots 47 and 48 provided at diametrically opposite points in the shaft.

Each clutch finger is provided with a projection 49 which operates in an annular groove or slot 50 in the clutch spacer 51.

An intermediate connection 54 is formed in the plunger 38 and has sliding engagement with the clutch fingers 45 and 46 so that when the plunger 38 is moved axially in the shaft 34, the part 54 will rock the clutch finger elements about their pivots to cause a resultant shifting of the spacer ring 51 in one direction or the other in accordance with the direction of the movement of the plunger 38.

The gear element 41 extends in the direction of the forward end of the shaft 38 to provide means 55 for receiving clutch disks. As is the usual custom, these disks may be formed with radial key projections which operate in axially extending slots in the gear extension 55 so as to provide axial movement of the clutch disks and at the same time, preventing relative rotation thereof.

Likewise, the gear element 42 is similarly extended rearwardly for positioning and receiving the second set of clutch disks. Alternate clutch disks are carried by the shaft 34 and are movable axially of the shaft, but not circumferentially thereof. These disks are free of the clutch gears 41 and 42. Thus, it will be seen that when the plunger 38 is, for instance, moved to the right in Figure 4, the member 54 will rock the fingers 45 and 46 about their pivots to thrust the spacer ring and compress the clutch disks and alternate disks to the left and thereby engage the drive from the gear 28 to the gear 41 and thence through the clutch to the shaft 34.

When the plunger 38 is moved to the left in Figure 4, the action of the clutch fingers is reversed to compress the reverse clutch plates and to thereby engage the drive through the gear 29, the idler gear 56 and the reverse clutch gear 42 to thereby drive the shaft 34 in a reverse direction to that which has just been described.

The rearward end of the shaft 34 is provided with means to brake the rotation of the shaft 34 and through it to the several selective gear clusters. The plunger, as has been stated before, operates through the shaft 34 and terminates beyond the rear end of the shaft in the housing 57. A brake cup 58 having inclined inner walls, is fixed in the housing 57 and receives a brake cone 59 having similarly inclined external walls and which is keyed to the shaft 34.

The rear end of the plunger 38 is provided with an annular seat or groove 60 in which are seated a plurality of balls 61. The balls 61 ride between the members 62 and 63 against the inclined surfaces thereof as indicated at 64. The member 63 is threaded to the end of the shaft 34 and rotates therewith.

A coiled compression spring 65 is housed in a space provided between the brake cone 59 and the member 63. The plate 62 rotates with the brake cone and is secured to the cone by means of bolts 66.

Thus it will be seen that when the plunger 38 is moved either to the right or left in Figure 4, that the balls 61 will be unseated from the annular groove 60 in the plunger and will tend to spread members 62 and 63 apart, thereby imparting opposite relative movement between the brake cone and the shaft in an axial direction.

In this manner the spring 65 is compressed and the brake cone and cup are disengaged. When the balls are seated in the groove 60, as shown in Figure 4, the brake elements are in braking engagement.

Forward or reverse drive of the shaft 34 is transmitted through a sliding gear cluster, which is splined as at 67, to the shaft.

This gear cluster comprises gear elements 68, 69 and 70, which are preferably formed as a single unit.

The remainder of the transmission gearing, as shown in Figure 4, is more or less conventional and may be described preferably as follows: a splined shaft 71 is mounted in suitable bearings 72 and 73 and carries the gear clusters 74 and 75, the gear cluster 74 comprising the gears 76 and 77.

As shown, the gear 77 is in mesh with the high speed gear 69 of the gear cluster splined to the shaft 34.

The gear cluster at 75 comprises the gears 78 and 79, the high speed connection being further transmitted through the gear 78 to a gear 80 on a shaft 81. The shaft 81 is supported in bearings 82 and 83 in the casing and carries a gear cluster comprising the gears 80 and 84 splined to the shaft and a cluster comprising gears 85 and 86 also splined to the shaft. The high speed drive is transmitted through the gear 85 to a gear 87 keyed to the spindle shaft 88. Spaced from the gear 87 by means of a spacer 89 is a gear 90 which is also keyed to the spindle shaft 88. The spindle shaft is mounted in roller bearings 91 and 92 and extends longitudinally of the casing as shown.

Figure 3:
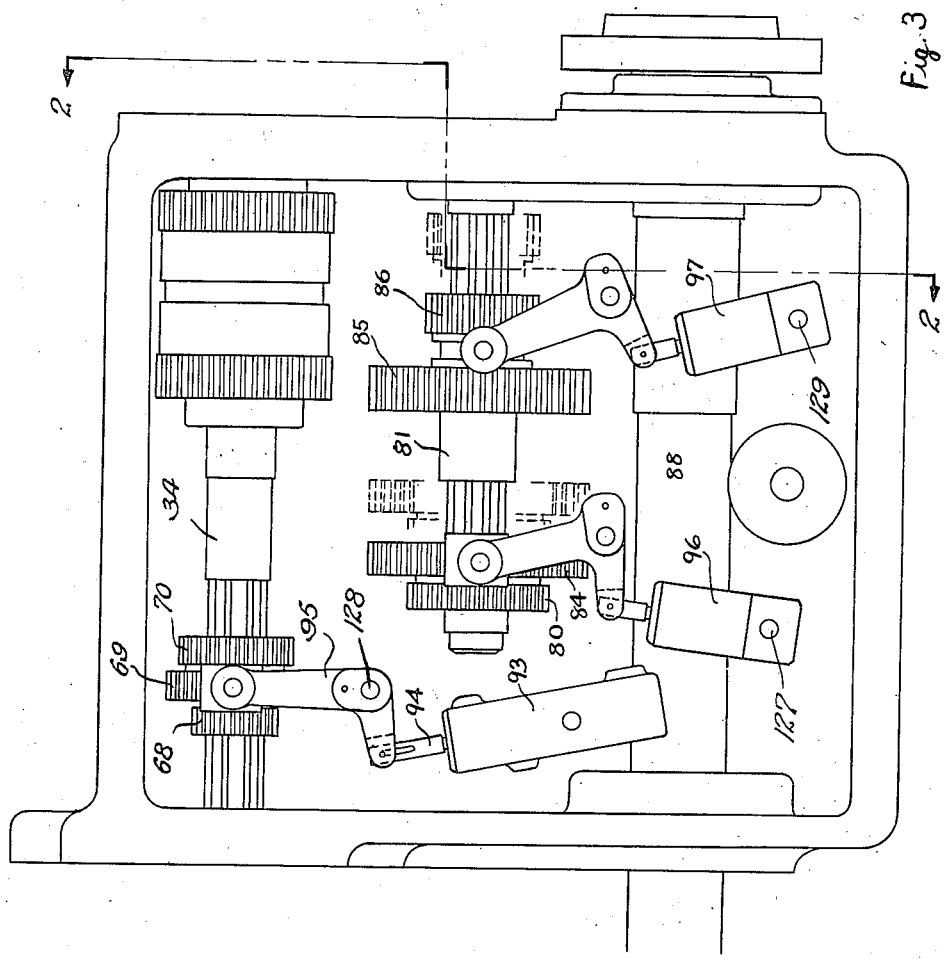
Figure 3 is a horizontal section through the casing and illustrates the hydraulic cylinders employed to shift the sliding gears of each of several clusters.

Referring now more particularly to Figure 3 of the drawings, we illustrate the several gear cluster operating cylinders, the sliding gear clusters being shown in the same relative position as shown in Figure 4.

As will be described more fully hereinafter, these operating cylinders are connected through a selector valve to a source of fluid under pressure.

In Figure 3 the operating cylinder 93 is connected through suitable means, such as a plunger rod 94 and a bell crank 95 to the triple sliding gear cluster 68, 69 and 70 on the shaft 34. The operating cylinders 96 and 97 are connected through similar means to the respective sliding gear clusters 80, 84, 85 and 86 on the shaft 81.

We will now proceed to describe the means for distributing fluid under pressure to the cylinders 93, 96 and 97. This means includes a selector valve which is mounted on the cover and lies within the chamber of the cover. This selector valve is operated by the preselector means which will be described more fully hereinafter. Primarily the selector valve comprises an outer shell 98 which is cylindrical in cross section and which is provided with an end plate 99 at the base thereof, there being a connection communicating fluid under pressure from the control valve 152 to the rotor. The rotor element of the selector valve comprises, in the illustration shown, a plurality of sections 100, 101, 102 superimposed one upon the other and having a common axial inlet 103 communicating with the opening in the base plate 99 and the conduit 160 leading from the control valve.

Each of the rotor elements is provided with radial openings communicating with the axial opening 103 thereof for communicating fluid under pressure between ports through the side wall of the shell 98 and the axial opening 103.

With the valve in the position shown in Figure 5 it will be seen that fluid entering the rotor through the conduits 160 and 103 will pass through the port 104 in the lower rotor section 102 and out through the conduit 105 to the intake port 106 of the positioning valve controlling the triple gear cluster operating means. This operating means is provided at one end with a positioning valve comprising a plug member 107 rotatable transversely in the casing 108. The oscillating positioning valve is provided at one end with a lever 109 having a pin 110 operating in the slot 111 formed in the end of the plunger rod 112. In the position shown in Figure 5 and in Figures 7 and 8 the oil will pass through the valve plug 107 and the opening 113 therein to the port 114 in the casing 115 which leads to the cylinder 116. At the same time the cylinder will exhaust through the port 117 and the conduit 118.

When the valve plug is rotated to its opposite extreme limit of motion by a plunger rod 112 operated by the piston 119 in the longer cylinder 120, the oil entering the plug at 106 will be transmitted to the port 117 in Figure 7 to the opposite side of the piston 121 in the smaller cylinder 116, while the opposite end of the cylinder will exhaust through the conduit 114 and the port 122 in the valve plug.

The piston in the smaller cylinder is connected through the connecting rod 123 and the push rod 124 which is slotted at 125 to receive a cross head 126 carried on the end of the longer piston rod 127 operated by the piston 119 in the longer cylinder 120.

Thus, when the parts are in the position shown in Figure 5, fluid will be transmitted to the piston 121 to actuate the same to the left, thereby causing the cross head 126 to pull the piston 119 in the longer cylinder to an intermediate position. As the piston in the larger cylinder approaches the intermediate position, it will be noted that the selector valve is so positioned that the conduits 176 and 177 on the opposite sides of the piston are in exhaust communication through the valve unit 102 and port 186 in the selector valve casing.

Referring now more particularly to Figure 16, which shows the two pistons in reversed position in the respective cylinders, the operation is substantially the same as described in connection with the parts in the position shown in Figure 5, except that the piston 121 in the smaller cylinder moves to the right to urge the piston 119 in the larger cylinder to the right toward an intermediate position and the respective ports 114 and 117 become inlet and exhaust ports.

When the selector valve is turned to admit the oil to the right side of the cylinder 120, the piston 119 travels to the left approximately half the distance without moving the piston 121 in the smaller cylinder, but as the piston 119 passes the intermediate point, it will, through the connection of the cross head with the connecting rod of the piston 121, move said piston with it so that both pistons will be in the position indicated in Figure 16.

During such operation the plunger rod 112 will engage the pin 110 in the valve plug head and shift the head and valve to the position shown in Figure 16. In this way the parts are so related that the positioning valve is in the proper position for again urging the piston 119 to a mid-way position in the cylinder 120 when the piston 121 is moved to the right.

The cross head 126 is connected through the bell crank 95 pivoted at 128 to operate the triple gear cluster 68, 69 and 70, which is splined to the shaft 34.

We have also provided cylinders 96 and 97 in Figure 5 and Figure 3 for operating the respective sliding gear clusters 80, 84, 85, and 86 as indicated.

Each of these cylinders comprises essentially a cylinder in which a piston and rod reciprocate, the rod in each case having connection with the respective bell crank of the operating unit.

Each cylinder is provided with ports in its side walls for receiving and exhausting the oil through the selector valve in accordance with the selected position of the valve.

The cylinders are mounted to pivot or rock on bolts 129 which support them in the casing 20.

Referring again more particularly to Figure 5, in which we have illustrated the selector valve, and means for distributing oil in the valve to the various cylinders, we have indicated the oil supply pump comprising the pump gears 31 and 32. Oil is fed into the pump through the conduit 150 and is fed from the pump into the conduit 151 to the control valve 152, there being a by-pass 153 around the pump and through a relief valve indicated generally at 154 and which is of the usual construction.

The control valve consists primarily of a casing 152 in which a plunger 155 is normally urged to its uppermost position by means of a coil spring 156, exerting a force of compression against the valve head 157 to seat the same against the seat 158 from the casing 152.

Oil under pressure is delivered into the chamber 159 and when the valve is opened, passes around the valve head 157 and up into the body of the valve and out through the conduit 160 in which it is delivered to the axial opening 103 through the superimposed valve units 100, 101, and 102.

From the axial opening 103 the oil is distributed through radial ports provided in each of the inner valve units 100, 101, and 102. In order to more clearly understand the construction and operation of the selector valve as shown in Figure 5, we have illustrated in Figures 18–29 sections taken through each of the units in parallel horizontal planes.

Figures 18, 19, and 20 are horizontal sections through the upper internal valve unit 100 and are taken on the lines indicated in Figure 5.

As shown by the sectional views through each unit, a plurality of radially arranged ports are provided communicating the central port 103 with ports provided in the shell 98 of the valve upon a predetermined position of the unit.

The arrangement of radial ports in the several valve units operating within the shell is such that predetermined delivery and exhaust of oil through certain circuits feed preselected cylinders, and may readily be determined by the operator merely by rotating the valve to a preselected position as indicated by the preselector means shown in Figures 11 and 12.

It is to be noted that the upper unit 100 is provided with an operating stem 161, which projects up through the neck of the shell and through the cover of the transmission housing and into the preselector indicating unit controlling the operation of the valve.

Each of the units 100, 101 and 102 is grooved annularly on its upper and lower surfaces near the periphery thereof so that when the three units are superimposed one upon the other, annular conduits 162, 163, 164, and 165 are formed.

Positioning pins 166 and 167 serve to properly align the three valve units when they are assembled, one above the other in the casing, and to maintain this alignment during rotation of the units as a whole.

Vertical openings 169 are drilled through that portion of the top of each unit comprising the annular groove and communicate below with short radial holes 218 formed inwardly from the periphery of the unit, but not communicating directly with the central conduit 103. Likewise, other short radial openings may also be formed in the lower portion of each unit to communicate downwardly with the annular groove formed in the lower surface of the respective unit.

The arrangement of the radial conduits communicating the outside of the respective units with the central conduit 103 is predetermined so that when the units are assembled and locked together, proper distribution of oil to the several cylinders, proper exhaust through the preselector valve and proper timing of distribution and exhaust will be assured for each preselected spindle speed to which the machine is set to operate.

It is understood that the specific port arrangements in the preselector valve, as illustrated herein, while desirable, need not be the only arrangements thereof which may be selected to properly operate the spindle at preselected speeds.

Returning again to Figure 5, when the valve units 100, 101, and 102 are in a position shown, the position of the gear cluster operating means will be as shown in Figure 3.

Reference has already been made to the operation of the triple gear cluster and the manner in which the valve distributes and exhausts oil to the auxiliary mechanism controlling this cluster.

The cylinder 96, which is connected to operate the gear cluster 80, 84, is also connected with the valve shell through the conduits 170 and 171, which feed and exhaust oil on opposite sides of the piston 172 operating its associated bell crank. These conduits are connected through the upper unit 100 of the valve to the source of oil under pressure and to exhaust.

Likewise cylinder 97, whose piston 175 operates the gear cluster 85, 86, is connected by means of conduits 173 and 174 with the preselector valve through the intermediate valve unit 101 to supply and exhaust oil to opposite sides of the piston 175 therein.

The lower valve unit 102 is connected by means of the conduits 176 and 177 with opposite sides of the piston 119 operating in a longer cylinder in the auxiliary control means for the triple gear cluster, and serve to supply and exhaust oil on opposite sides of the piston in the cylinder, as in the case of the previously mentioned cylinders 96 and 97. A conduit 105 also communicates with the lower valve unit 102 and with the control valve of the auxiliary operating means for the triple gear cluster to feed oil under pressure through the said control valve to operate the piston 121 in the shorter cylinder of this unit.

Referring now to Figures 18 to 28 inclusive, which show horizontal sections through the valve units 100, 101, and 102 as they are positioned in Figure 5, the radial port 180 is shown in communication with the conduit 170 which has delivered oil to the left face of piston 172, and which has moved the piston to the right.

In Figure 20 the conduit 171 is shown in communication with the exhaust opening 181, the annular groove 163 and the exhaust port 186. Thus it will be seen that when oil is admitted through the valve and thus through the upper unit 100, no movement of the piston 172 will take place.

This is also true in connection with the piston 175 in the cylinder 97.

However, when the operating valve 155 is depressed, oil will be transmitted through the lower valve section 102 and through the conduit 105 to operate the positioning valve 109 as has been described hereinbefore, to shift the triple gear cluster.

Assuming now that a spindle speed is selected in which the valve units will be rotated 180° from the position shown in Figure 5, and in Figures 18-29, the distribution and exhaust of oil will be as follows:

Referring to Figure 19, the duct 180 will then be aligned at a point diametrically opposite from the position shown, and the exhaust opening 182 will be in communication with the conduit 170. In the same manner the exhaust opening 181 in the unit 100 will be diametrically opposite in Figure 20, and the radial opening 183 will then be in communication with the conduit 171.

When the unit is in this position, oil will be fed through the conduit 171 and against the right face of the piston 172 to force the piston to the left and at the same time exhaust oil from the cylinder through the conduit 170 to the opening 182 and finally out through the exhaust opening in the casing, indicated at 186.

Similarly, referring to the intermediate unit 101, which, as explained above, likewise has been rotating 180°, the conduit 187 extending diametrically through the unit will have been moved in Figure 22, but such movement will still provide communication between the intake 103 and the conduit 173 to supply oil to the left side of the piston 175.

In Figure 23 it will be noted that there likewise will be no change in the operation by rotating the unit 180° because the exhaust port 188 will have replaced the exhaust port 189 in communication with the conduit 174. Consequently, there will be no motion of the piston 175 in the cylinder 97. In connection with the lower unit of the valve in Figure 5, which, when rotated 180°, the conduit 177 will remain connected to an exhaust port 186 in the lower part of the casing through the opening 190, the radial opening 191 will have been moved to communicate through the conduit 176 and the radial port 192 will have been moved out of communication with the conduit 105 (Fig. 27) and the latter will have been connected to exhaust through the opening 193, the groove 165 and the port 186. In this position, oil will be fed to operate the control valve 109. At the same time, oil will be fed through the conduit 176 to thrust piston 119 of the triple cluster gear operating means to the right from its intermediate position in its cylinder.

It is obvious that various other combinations of delivery and exhaust through the several circuits connected with the several cylinders may be made, and it is by this means that we are enabled to preselect any one of considerable number of spindle speeds in operating the machine.

Referring now more particularly to Figures 1, 2, 11, and 12, we have illustrated a novel means for operating the preselector valve, and at the same time to indicate directly to the operator of the machine the spindle speed preselected as well as to provide means for quickly preselecting subsequent spindle speeds in a regular order.

This means includes a casing 194 which is removably attached to the cover 21. The front face of the casing is provided with a scale 195 reading in feet per minute, along the side of a window 196.

The stem 161 of the preselector valve extends upwardly through the casing 21 and terminates in a prolonged shank and telescopically receives the rotatable element 197 of the spindle speed indicator and operating means handle 198, and is attached thereto by means of a bolt 199 passing through the element 197 and threaded into the stem 161.

The upper portion of the rotatable indicator member is provided with grooves 200 extending longitudinally downward from the top of the member and equally spaced around the periphery thereof to provide intermediate ridges 201 for receiving indicator clips 202. There is also a window 203 formed in the casing of the indicator and directly above the window 196.

The scale 195 is graduated on opposite sides of the window 196 with indicia indicating "feet per minute," while the element 197 carries a scale 204 behind the windows 196 and 203 bearing indicia relating to "diameter," that is diameter of the work, and to "spindle speed" respectively. By this arrangement the operator can preselect a desired spindle speed by rotating the element 197 and aligning the diameter of the work with the proper indicated "feet per minute" speed on the scale 195.

Referring, now more particularly to Figures 1, 2, 5 and 10, we have illustrated the detail construction of a control lever for operating the preselector valve.

With particular reference to Figures 1, 2 and 10, the control lever is shown at 205, and comprises the handle portion extending over the casing 20 and the cover therefor to a convenient point for operation and gripping by the operator. The forward end of the lever terminates in an enlarged portion or head 206 which is pivotally supported for swinging about a vertical axis or stud 207 carried by the forked block 208 and which operates in an opening in the cover. The stud extends downwardly in a suitable bearing and is connected by means of a link 209 to the fork 40, which is operatively connected to the clutch shaft 28 shown in Figure 4. The forked block 208 extends upwardly on opposite sides of the forward end of the lever designated at 210, the end of the lever being pivotally mounted in the fork by means of a pin 211 lying along a horizontal axis with respect to the stud 207. The stud 207 and the block 208 are preferably formed as an integral unit and, by virtue of the vertical and horizontal pivot means, the lever is capable of movement in these directions for purposes which will be described more fully hereinafter.

The lever in its movement about the horizontal axis defined by the pin 211 is normally urged so that its handle end will move upwardly when the control lever is in a predetermined position.

At 212 we have illustrated a spring for normally urging the lever to its position. The extreme forward end of lever indicated at 213 is formed with a downwardly projecting nose which is attached to enter a slot 214 formed in the adjacent portion of the bracket 33 when the control lever is shifted to a predetermined position.

When the lever is in this position, the detent will urge the lever about its horizontal pivot to engage the nose 213 in the slot 214. This position of the control lever represents the neutral or braked position.

The control lever carries a trip block 215 which is bolted thereto as shown in Figure 2, and is provided along its under face with a groove 216 extending from one end of the block to an intermediate portion.

The bracket 33 of the casing 20 is provided with a stop member 217 which projects upwardly from the casing cover and is adapted to enter the slot 216 when the lever is in a predetermined position and when the lever is depressed about its horizontal axis. When the lever is depressed in this position, it will be noted that the trip block 215, extending directly over the plunger 155 of the control valve, will engage the same to depress it and thus admit oil from the pump to the preselector valve, as indicated more clearly in Figure 5. It will also be noted that by virtue of the construction described above, the control lever cannot be tripped to actuate the plunger of the control valve, while the clutch is operatively connected.

When the control lever is swung in one direction, a preselection of gear ratios is made in a forward direction as determined by the position of the preselector controlling the position of the preselector valve. When the control lever is swung to the extreme opposite position, a selection may be made for reverse rotation of the spindle.

When it is desired to brake the drive through the spindle, the lever is swung about the vertical pivot until the nose 213 thereof is immediately above the slot 214 at which point the spring detent 212 will urge the nose into the slot, automatically providing a neutral position or brake for the drive mechanism.

When the lever is in the neutral or brake position as described, the operator cannot accidentally move the lever about its vertical axis while the parts are in the position described.

Due to the positioning of the block 215 over the stop 217 and the relationship of the slot 216 thereto, the plunger 155 of the control valve cannot be depressed to shift the gears unless the upwardly projecting stop 217 is in strict alignment with the slot 216 and can enter the same, and in this position of the parts it will be observed from Figure 4 that the clutch will be disengaged.

Various changes in the details of construction and arrangement of parts may be made without departing from the spirit of our invention or the scope of the appended claims.

We claim:

1. In a speed changing mechanism for sliding gear transmissions, means for preselecting each of several speeds obtainable in said gear transmission, said preselector means including a selector valve, means for distributing fluid under pressure from the valve to slide the gear clusters in said transmission, means for controlling the delivery of fluid under pressure to said valve, and a control member for actuating said control means, said control member comprising a lever mounted for pivotal movement about axes lying in intersecting planes, said pivotal movement about one of said axes being utilized to actuate said control means.

2. In a speed changing mechanism for sliding gear transmissions, means for preselecting each of several speeds obtainable in said gear transmission, said preselector means including a selector valve, means for distributing fluid under pressure from the valve to slide the gear clusters in said transmission, means for controlling the delivery of fluid under pressure to said valve, a clutch, and a control member for actuating said clutch and said control means, said member comprising a lever mounted for pivotal movement about axes lying in intersecting planes, said pivotal movement about one of said axes being utilized to actuate said control means and pivotal movement about said other axis causing actuation of said clutch.

3. In a machine tool, a driven spindle, a sliding gear transmission comprising a plurality of gear clusters for rotating the spindle at selected spindle speeds, a clutch, means for preselecting said spindle speeds, hydraulically operated mechanism for operatively engaging said clusters in response to a preselected spindle speed, and a control lever mounted on said machine tool, said lever being rockable in one direction to actuate the clutch and rockable in another direction to actuate said hydraulic means subsequent to a preselected setting of the spindle speed.

4. In a machine tool, a driven spindle, a sliding gear transmission for rotating the spindle at selected speeds, hydraulic means for shifting the sliding gears of the transmission, means for preselecting the speed at which the spindle is rotated, a clutch, a control member operable to release the hydraulic means and substantially simultaneously effect a driving connection through the clutch and gearing with the spindle shaft at a preselected spindle speed, and means cooperating with the control member to prevent actuation of the hydraulic means while the clutch is operatively connected.

5. In a machine of the class described, a sliding gear transmission, a work spindle driven by said transmission at preselected spindle speeds, hydraulic means for selecting each of several speed ratios obtainable by said transmission, said selecting means including a preselector valve having operable connection with each of the several gear clusters of said transmission, manually operated means for preselecting the valve position in accordance with the spindle speed desired and a control member adapted to pivot about each of two axes lying in intersecting planes to effect a driving connection with the work spindle when moved about one axis and to release fluid under pressure through said preselector valve when moved about said other axis.

6. In a machine of the class described, a sliding gear transmission, a work spindle driven by said transmission at preselected spindle speeds and hydraulic means for selecting each of several speed ratios obtainable by said transmission, said selecting means including a preselector valve having operable connection with each of the several gear clusters of said transmission, fluid cylinders associated with each movable gear cluster, manually operated means for preselecting the valve position in accordance with the spindle speed desired, a clutch control member operable independently of said valve operating means, a clutch in said transmission, and a control valve for feeding fluid under pressure to said preselector valve, said clutch control member also being operatively connected with said control valve.

7. In a machine of the class described, the combination with a hydraulically operated sliding gear transmission, including a clutch shaft, of clutch operated means for driving said shaft in reverse directions, braking means carried by said shaft, a plunger slidable within the shaft for operating said clutch and brake, and a manual control member for sliding said plunger whereby to simultaneously release the brake on the clutch shaft when said shaft is driven in either direction of rotation.

8. In a machine tool, a sliding gear transmission, a work spindle driven by said transmission at preselected spindle speeds, and hydraulic means for selecting each of several speed ratios obtainable by said transmission, said means including a preselector valve having operating hydraulic connection with each of the several gear clusters of the transmission, indicating means for setting said valve for a preselected spindle speed, and a control lever movable about axes lying in intersecting planes for admitting fluid under pressure to said valve when moved about one of said axes and for effecting a driving connection through said transmission when moved about the other of said axes.

9. In a machine of the class described, the combination with a hydraulically operated sliding gear transmission, and a work spindle driven by said transmission, of means for directly effecting any one of a plurality of spindle speeds, said means including a preselector valve having operating hydraulic connection with each of several gear clusters of said transmission, indicating means for setting said valve for a preselected spindle speed, a manually operated control member for admitting fluid under pressure to said preselector valve, said preselector valve comprising an outer casing having feed and exhaust ports therein, and an inner rotatable member consisting of a plurality of superimposed sections rotatable in the casing as a unit and having prearranged passageways therein for feeding and exhausting fluid under pressure with respect to the ports in the casing, the predetermined positions of said ports in the casing and the relative arrangement of the ports in the superimposed sections being such that upon rotation of the inner valve member to a preselected position and upon operation of said control member admitting fluid under pressure to said preselector valve, said spindle will respond to a preselected spindle speed.

10. The combination with a sliding gear transmission including a drive shaft, a driven shaft and a plurality of intermediate sliding gear clusters, of a clutch, a clutch operated shaft intermediate the drive shaft and the several gear clusters, a brake on said clutch operating shaft, hydraulic means for selecting each of several speed ratios obtainable in said transmission, and a single control lever movable about axes lying in intersecting planes, said lever actuating said clutch, brake and hydraulic means in a predetermined timed relation when moved about one of said axes and actuating said hydraulic means when moved about the said other axis.

11. The combination with a sliding gear transmission including a drive shaft, a driven shaft, and a plurality of intermediate sliding gear clusters, of a clutch, a clutch operated shaft intermediate said drive shaft and the gear clusters, hydraulic means for selecting each of several speed ratios obtainable in said transmission, a control valve and a single control means operable to actuate said valve and said clutch, said control comprising a lever operable about intersecting axes.

12. The combination with a sliding gear transmission including a drive shaft, a driven shaft, and a plurality of intermediate sliding gear clusters, of a clutch, a clutch operated shaft intermediate said drive shaft and the gear clusters, a brake on said clutch shaft, hydraulic means for selecting each of several speed ratios obtainable in said transmission, and a single control for actuating said clutch, brake and hydraulic means in a predetermined timed relation, said control comprising a member operable about intersecting axes to actuate said clutch and brake in timed relation when operated about one axis and movable about the other axis to actuate said hydraulic means.

13. The combination with a sliding gear transmission including a drive shaft, a driven shaft, and a plurality of intermediate sliding gear clusters, of a clutch, a clutch operated shaft intermediate said drive shaft and the gear clusters, a brake on said clutch shaft, hydraulic means for selecting each of several speed ratios obtainable in said transmission, a single control for actuating said clutch, brake and hydraulic means in a predetermined timed relation, said control comprising a member operable about intersecting axes to actuate said clutch and brake in timed relation when operated about one axis and movable about the other axis to actuate said hydraulic means, and means to prevent the movement of the lever about said other axis except when said clutch is disengaged.

14. The combination with a sliding gear transmission including a drive shaft, a driven shaft, and a plurality of intermediate sliding gear clusters, of a clutch, a clutch operated shaft intermediate said drive shaft and the gear clusters, a brake on said clutch shaft, hydraulic means for selecting each of several speed ratios obtainable in said transmission, and a single control for actuating said clutch, brake and hydraulic means in a predetermined timed relation, said control comprising a member operable about intersecting axes to actuate said clutch and brake in timed relation when operated about one axis and movable about the other axis to actuate said hydraulic means, and means to prevent the movement of the lever about said other axis except when said clutch is disengaged, said last named means comprising interfitting members, one of which is carried by the lever.

15. In a sliding gear transmission a drive shaft, a driven shaft, a clutch intermediate said shafts, sliding gear clusters intermediate said clutch and the driven shaft, and hydraulically operated means for selecting each of several speed ratios obtainable in said transmission, said last named means including a preselector valve, means associated with each gear cluster and operable through said valve for sliding the respective clusters, and a control valve for supplying fluid under pressure to the preselector valve, and means for engaging and disengaging said clutch and operating said control valve, said last named means being movable about two axes whereby movement about one of said axes will cause said clutch to be engaged or disengaged and movement about said other axis will actuate said control valve only when said clutch is disengaged.

16. A hydraulically operated sliding gear transmission including a drive shaft, a clutch, a driven spindle shaft, a plurality of sliding gear clusters, and hydraulic means for sliding said clusters including a preselector valve, a control valve, a single control means for operating the control valve and said clutch, and means for selecting the position of said preselector valve during engagement of the clutch but prior to a subsequent speed change of the spindle shaft for which the selection is made.

17. A hydraulically operated sliding gear transmission including a drive shaft, a clutch, a driven spindle shaft, a plurality of sliding gear clusters, and hydraulic means for sliding said clusters including a preselector valve, a control valve, a single control means for operating the control valve and said clutch, and means for selecting the position of said preselector valve during engagement of the clutch but prior to a subsequent speed change of the spindle shaft for which the selection is made, said last named means comprising an indicator having indicia thereon indicating the spindle speed preselected.

18. A hydraulically operated sliding gear transmission including a drive shaft, a clutch, a driven spindle shaft, a plurality of sliding gear clusters, and hydraulic means for sliding said clusters including a preselector valve, a control valve, a single control means for operating the control valve and said clutch, and means for selecting the position of said preselector valve during engagement of the clutch but prior to a subsequent speed change of the spindle shaft for which the selection is made, said last named means comprising an indicator having indicia thereon indicating the spindle speed preselected and having means associated therewith whereby a plurality of successive preselected spindle speed settings may be indicated.

19. In a machine of the class described, the combination with a hydraulically operated sliding gear transmission, including a clutch shaft, of clutch operated means for driving said shaft in reverse directions, braking means carried by said shaft, a plunger slidable within the shaft for operating said clutch and brake, a preselector valve, a control valve, and a single manual control member for sliding said plunger whereby to simultaneously release the brake on the clutch shaft when the shaft is driven in either direction of rotation and to operate said control valve.

20. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions.

21. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions, said last named means comprising a pair of cylinders, plungers in said cylinders, one of said plungers being operable hydraulically to position the said gear cluster at either extreme limit of motion on said shaft, the other of said plungers being operable to position said first plunger.

22. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions, said last named means comprising a pair of cylinders, plungers in said cylinders, one of said plungers being operable hydraulically to position the said gear cluster at either extreme limit of motion on said shaft, and means movable by said one plunger to operate said positioning valve.

23. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions, said last named means comprising a pair of cylinders, plungers in said cylinders, one of said plungers being operable hydraulically to position the said gear cluster at either extreme limit of motion on said shaft, and means movable by said one plunger to operate said positioning valve, the other of said plungers being operable hydraulically through said positioning valve and having a driving connection with said first plunger, the stroke of the second plunger being substantially one-half that of the first named plunger.

24. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions, said last named means comprising a pair of cylinders, plungers in said cylinders, one of said plungers being operable hydraulically to position the said gear cluster at either extreme limit of motion on said shaft, the other of said plungers being operable hydraulically through said positioning valve and having a driving connection with said first plunger, the stroke of the second plunger being substantially one half that of the first named plunger.

25. In a sliding gear transmission a plurality of sliding gear clusters, a driven shaft, one of said clusters comprising a triple gear unit slidable on said shaft, and means for sliding said triple gear cluster to any one of three positions, said means including a cluster shifting member, and a control means for said member, said control means including a source of fluid under pressure, a positioning valve, means for controlling the flow of fluid to said valve and means associated with the positioning valve and with the shifting member for actuating the latter so that said triple gear cluster may be selectively shifted to any one of three positions from any other of said positions, said last named means comprising a pair of cylinders, plungers in said cylinders, one of said plungers being operable hydraulically to position the said gear cluster at either extreme limit of motion on said shaft, and means movable by said one plunger to operate said positioning valve, the other of said plungers being operable hydraulically through said positioning valve and having a driving connection with said first plunger, the stroke of the second plunger being substantially one-half that of the first named plunger whereby said first plunger may be moved from one extreme position in its cylinder to a point intermediate its limits of movement therein.

OSKAR KYLIN.
HENRIK O. KYLIN.